(12) United States Patent
Lin et al.

(10) Patent No.: US 10,604,114 B2
(45) Date of Patent: Mar. 31, 2020

(54) METHOD FOR CONTROLLING ACCESS TO A VEHICLE AS WELL AS A SYSTEM FOR CONTROLLING ACCESS TO A VEHICLE

(71) Applicant: TRW AUTOMOTIVE U.S. LLC, Livonia, MI (US)

(72) Inventors: Xing Ping Lin, West Bloomfield, MI (US); Mark Baker, Brighton, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 16/201,036

(22) Filed: Nov. 27, 2018

(65) Prior Publication Data
US 2019/0161058 A1    May 30, 2019

Related U.S. Application Data

(60) Provisional application No. 62/592,511, filed on Nov. 30, 2017.

(51) Int. Cl.
| | | |
|---|---|---|
| *B60R 25/24* | (2013.01) | |
| *G07C 9/00* | (2020.01) | |
| *H04W 4/02* | (2018.01) | |
| *H04W 4/40* | (2018.01) | |

(52) U.S. Cl.
CPC .......... *B60R 25/24* (2013.01); *G07C 9/00309* (2013.01); *H04W 4/023* (2013.01); *H04W 4/40* (2018.02); *B60R 2325/101* (2013.01); *B60R 2325/105* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 2010/0075656 A1 | 3/2010 | Howarter et al. | |
| 2012/0086549 A1* | 4/2012 | Barnes, Jr. ......... | G06Q 10/1053 340/5.61 |
| 2013/0238167 A1* | 9/2013 | Stanfield .................. | G08G 1/20 701/2 |
| 2014/0067161 A1 | 3/2014 | Conner et al. | |
| 2015/0015367 A1* | 1/2015 | Lin ......................... | B60R 25/20 340/5.63 |
| 2016/0078700 A1 | 3/2016 | Yeh et al. | |
| 2016/0110988 A1* | 4/2016 | Nixon ..................... | B60R 25/24 340/539.32 |
| 2017/0074000 A1* | 3/2017 | Banvait ................... | B60R 25/01 |
| 2017/0352214 A1* | 12/2017 | Maiwand ........... | G07C 9/00896 |
| 2018/0065597 A1* | 3/2018 | Kim ........................ | B60R 25/24 |
| 2019/0197808 A1* | 6/2019 | Jinnai ................... | B60R 25/102 |

* cited by examiner

*Primary Examiner* — Carlos Garcia
(74) *Attorney, Agent, or Firm* — Tarolli, Sundheim, Covell & Tummino LLP

(57) ABSTRACT

A method for controlling access to a vehicle includes storing at a vehicle-based system a GPS location of the vehicle associated with the location at which the vehicle is parked. The vehicle-based system communicates with a mobile device to obtain a GPS location of the mobile device. The vehicle-based system blocks entry to the vehicle if the GPS location of the mobile device is outside a predetermined distance from the stored GPS location of the vehicle.

17 Claims, 2 Drawing Sheets

METHOD FOR CONTROLLING ACCESS TO A VEHICLE AS WELL AS A SYSTEM FOR CONTROLLING ACCESS TO A VEHICLE

FIELD OF THE DISCLOSURE

The disclosure relates to a method for controlling access to a vehicle, in particular vehicle keyless entry as well as a system for controlling access to a vehicle, in particular a vehicle keyless entry system

BACKGROUND

It is known that vehicle remote keyless entry systems (RKE) or passive keyless entry systems (PKE) can be susceptible to attacks referred to as a relay attack theft. Such a scenario known from the state of the art is shown in FIG. 1.

The keyless entry system for a vehicle 1 comprises a low frequency (LF) base station 2 and a radio frequency (RF) receiver 3 in the vehicle 1.

Further, the system comprises a security token 4, for example a key fob having an LF receiver 5 and an RF transmitter 6.

Under normal circumstance, when a user carrying the security token 4 approaches his vehicle 1 and lifts the door handle, the door handle will initiate the low frequency base station 2 to create a LF field with specific information. The LF field causes the LF receiver 5 of the security token 4 to power on and receive the information from the base station 2 via the LF field.

The information or a suitable response to the information is transmitted by the RF transmitter 6 as a message to the RF receiver 3 in the vehicle 1. After a verification of the message, i.e. the information or the response, access is granted and the vehicle is unlocked.

As shown in FIG. 1, a relay attack with two thieves T1, T2 may be carried out. Both thieves T1, T2 have LF/RF devices 7, 8 that communicate with each other.

The first thief T1 is close to the vehicle 1 and the second thief T2 is close to the user U of the vehicle.

The first thief T1 approaches the vehicle 1 and lifts the door handle to initiate the usual entry procedure. The LF/RF device 7 of the first thief T1 receives the information transmitted from the LF base station 2 in the LF field and sends this message to the corresponding LF/RF device 8 of the second thief T2.

The LF/RF device 8 of the second thief T2 in turn generates the same LF field with the same information as the vehicle 1 but close to the user U so that the security token 4 of the user U performs the same steps as if it were close to the vehicle 1.

The second thief T2 with its LF/RF device 8 receives the RF information or response transmitted from the RF transmitter 6 of the security token 4 and relays this information back to the LF/RF device 7 of the first thief T1.

The LF/RF device 7 of the first thief T1 then sends the same RF information or response to the RF receiver 3 of the vehicle 1.

For the vehicle 1, it seems that the security token 4 is within the vicinity of the vehicle 1 and thus the vehicle is unlocked even though the user U is far away from the vehicle 1.

Thus, there is a need to provide a method and a system for controlling access to a vehicle that prevent a relay attack on a vehicle without limiting the comfort of the keyless entry system.

SUMMARY

For this purpose, a method for controlling access to a vehicle, in particular vehicle keyless entry is provided. The method comprises:
  providing a vehicle-based system comprising a transceiver operatively connected with a vehicle control module; and
  providing a mobile device having a GPS module and a wireless communication module;
  storing at the vehicle-based system a GPS location of the vehicle associated with the location at which the vehicle is parked;
  communicating via the vehicle-based system with the mobile device via the transceiver and the wireless communication module to obtain a GPS location of the mobile device; and
  blocking via the vehicle-based system entry to the vehicle if the GPS location of the mobile device is outside a predetermined distance from the stored GPS location of the vehicle.

By blocking access to the vehicle when the mobile device is outside the predetermined distance, relay attacks can be prevented successfully. Even if the transmission between the vehicle and the mobile device were to be relayed, the position of the mobile device would still be outside the predetermined distance. Thus, relay attacks are effectively prevented.

The mobile device may be a GPS and Bluetooth enabled cell phone, a tablet, a laptop or the like. Further, the mobile device may be owned by an authorized user of the vehicle.

The predetermined distance may be the distance of the operating range of the transceiver and/or of the base station.

The mentioned method steps are, for example, performed by the vehicle control module.

In order to determine the location of the mobile device precisely, the method comprises the following further steps:
  sending instructions to the mobile device via the transceiver and the wireless communication module requesting the GPS location of the mobile device,
  determining the GPS location of the mobile device using the GPS module, and
  transmitting the GPS location of the mobile device to the vehicle control module via the wireless communication module and the transceiver.

For example, the method further comprises determining via the vehicle-based system when the vehicle is parked so that the GPS location of the vehicle associated with the location at which the vehicle is parked may be determined immediately.

In an embodiment of the disclosure, the method comprising the following further steps for ensuring quick access to the car:
  receiving an entry request by the vehicle control module; and
  allowing entry to the vehicle if at least the GPS location of the mobile device is within a predetermined distance from the stored GPS location of the vehicle.

The communication to obtain a GPS location of the mobile device may be initiated upon entry request to reduce the time needed to grant access.

In another embodiment of the disclosure, the method comprises the following further steps:
  the vehicle based system having a base station in the vehicle configured to generate an electromagnetic field having a first frequency and having a receiver to receive transmissions having a second frequency, providing a security token, in particular a key fob, having a receiver for the electromagnetic field having the first frequency and a transmitter for transmissions having the second frequency;

generating the electromagnetic field having the first frequency by the base station and receiving the electromagnetic field by the security token;

transmitting a message by the security token to the vehicle based system via the transmitter of the security token and the receiver of the vehicle based system;

verifying the message via the vehicle control module; and allowing entry to the vehicle if at least the verification was successful and the GPS location of the mobile device is within a predetermined distance from the stored GPS location of the vehicle.

Thus, access to the vehicle can be granted in a keyless way.

The first frequency and the second frequency may be the same.

For example, the security token may be a key fob, in particular of a remote keyless entry (RKE) system or of a passive keyless entry (PKE) system.

The communication to obtain the GPS location of the mobile device may also be initiated after successful verification of the message in order to reduce unnecessary requests to the mobile device.

Preferably, the first frequency is lower than the second frequency, in particular wherein the first frequency is a low-frequency and the second frequency is a radio-frequency, providing a robust method.

The low frequency may be between 20 kHz and 150 kHz, in particular 125 kHz or 130 kHz. The radio-frequency is for example a UHF frequency, in particular 315 MHz, 433 MHz or 868 MHz.

For example, the receiver of the security token is a RFID-receiver or a RFID-transponder so that not power source for the security token is needed.

In an aspect of the disclosure, the entry request is generated when using a door handle of the vehicle or when a proximity sensor detects the proximity of a person at a door of the vehicle so that no extra actions by the user of the vehicle are needed.

In order to improve the security of the method even further, the method comprises the following further steps:

verifying whether the mobile device is authenticated with the vehicle control module, and blocking entry to the vehicle if the mobile device is not authenticated with the vehicle control module.

For the above purpose, further a system for controlling access to a vehicle, in particular a vehicle keyless entry system is provided. The system comprises a vehicle-based system comprising a transceiver operatively connected with a vehicle control module, a mobile device and optionally a security token, wherein the mobile device, the vehicle-based system and the optional security token are configured to jointly perform a method as described above.

The features and advantages discussed in the context of the method also apply to the system.

DESCRIPTION OF THE DRAWINGS

Further features and advantages of the disclosure will be apparent from the following description as well as the accompanying drawings, to which reference is made. In the drawings.

DETAILED DESCRIPTION

Figure 1:
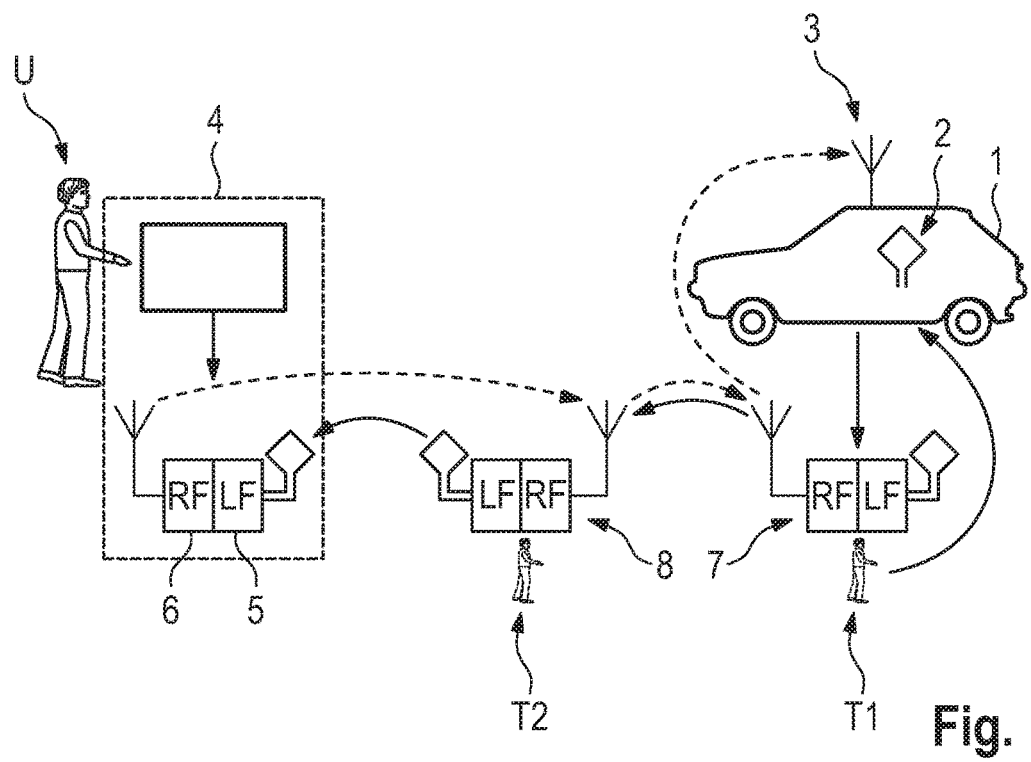
FIG. 1 shows schematically a vehicle keyless entry system according to the state of the art.
Figure 2:
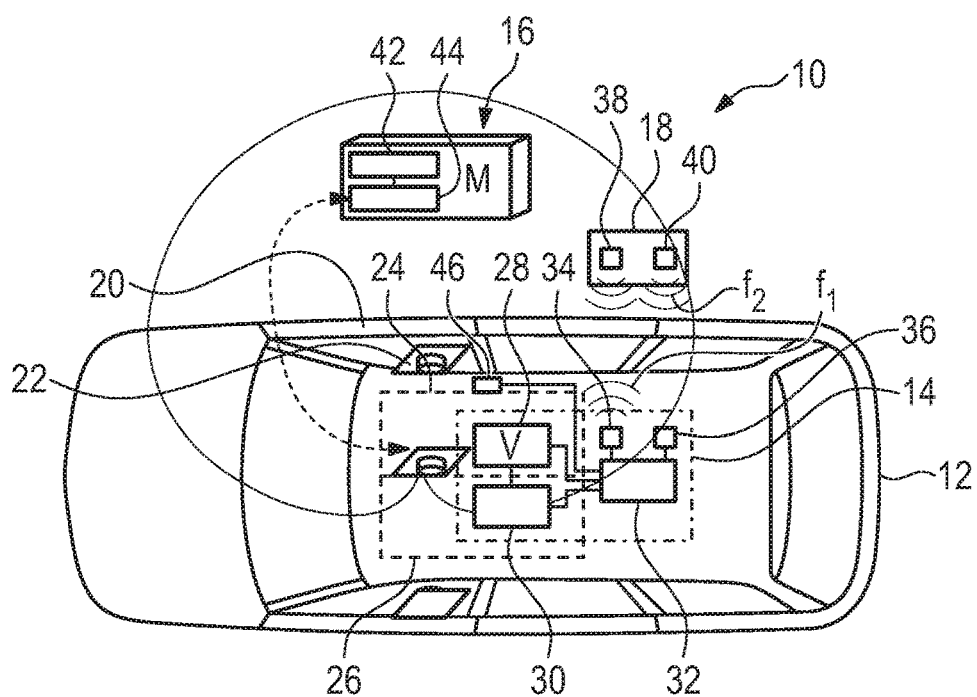
FIG. 2 shows schematically a system for controlling access to a vehicle according to the disclosure.

FIG. 1 shows a system 10 for controlling access to a vehicle 12, having a vehicle-based system 14, a mobile device 16 and a security token 18.

The vehicle 12 may be a passenger car, a truck, a bus, or the like.

In the shown embodiment, the vehicle 12 is a passenger car having doors 20 with door locks 22, a navigation system 24, an infotainment system 26 and the vehicle-based system 14.

The navigation system 24 may comprise a GPS receiver 28.

The infotainment system 26 may comprise a transceiver 30, for example a Bluetooth transceiver capable of communicating via the Bluetooth protocol.

The vehicle-based system 14 comprises a vehicle control module 32, a base station 34 and a receiver 36.

The vehicle control module 32 is connected to the door locks 22 of the doors 20, the transceiver 30 of the infotainment system 26, the GPS receiver 28 of the navigation system 24, the base station 34 and the receiver 36. The connection is operatively such that the vehicle control module 32 is configured to control the mentioned components.

Thus, the GPS receiver 28 and the transceiver 30 can also be seen as being part of the vehicle-based system 14.

Of course, the GPS receiver 28 and the transceiver 30 of the vehicle-based system 14 may be separate from the navigation system 24 and the infotainment system 26, respectively.

The base station 34 is, for example, a low frequency base station capable of generating a low frequency field in the proximity of the vehicle 12. The low frequency field may have a first frequency $f_1$.

The receiver 36 is configured to receive transmissions in a second frequency $f_2$. For example, the receiver 36 is a radio frequency receiver.

The first frequency $f_1$, i.e. the low frequency, may be between 12 kHz and 150 kHz, in particular the first frequency $f_1$ may be 125 kHz or 130 kHz.

The second frequency $f_2$, e.g. the radio frequency may be a UHF frequency, in particular 315 MHz, 433 MHz or 868 MHz.

Of course it is also possible, that the first frequency $f_1$ and the second frequency $f_2$ are the same frequency. In this case, the base station 34 and the receiver 36 may be a single transceiver.

The security token 18 may be a key fob, especially a key fob for a remote keyless entry (RKE) system or a passive keyless entry (PKE) system.

The security token 18 comprises a receiver 38 for the electromagnetic field having the first frequency $f_1$, and a transmitter for transmitting a signal having the second frequency $f_2$.

In the shown embodiment, the receiver 38 is thus a low frequency receiver and the transmitter 40 is a radio frequency transmitter.

The receiver 38 is for example a RFID-receiver or a RFID-transponder.

The mobile device 16 is for example a cell phone, a tablet, a laptop or the like. The mobile device 16 comprises a wireless communication module 42, for example a Bluetooth module, and a GPS module 44.

Further, the mobile device 16 may be owned by an authorized user of the vehicle.

The mobile device 16 is authenticated with the vehicle control module 32, i.e. this specific mobile device 16 has been registered with the vehicle control module 32 as a trusted device.

The vehicle 12 may further comprise a proximity sensor 46 as part of the vehicle-based system 14 configured to detect the proximity of a person at one of the doors 20 of the vehicle 12.

When a user wishes to gain access to the vehicle 12, he approaches the vehicle 12 carrying the security token 18 and the mobile device 16 that had been authenticated with the vehicle control module 32 beforehand.

Figure 3:
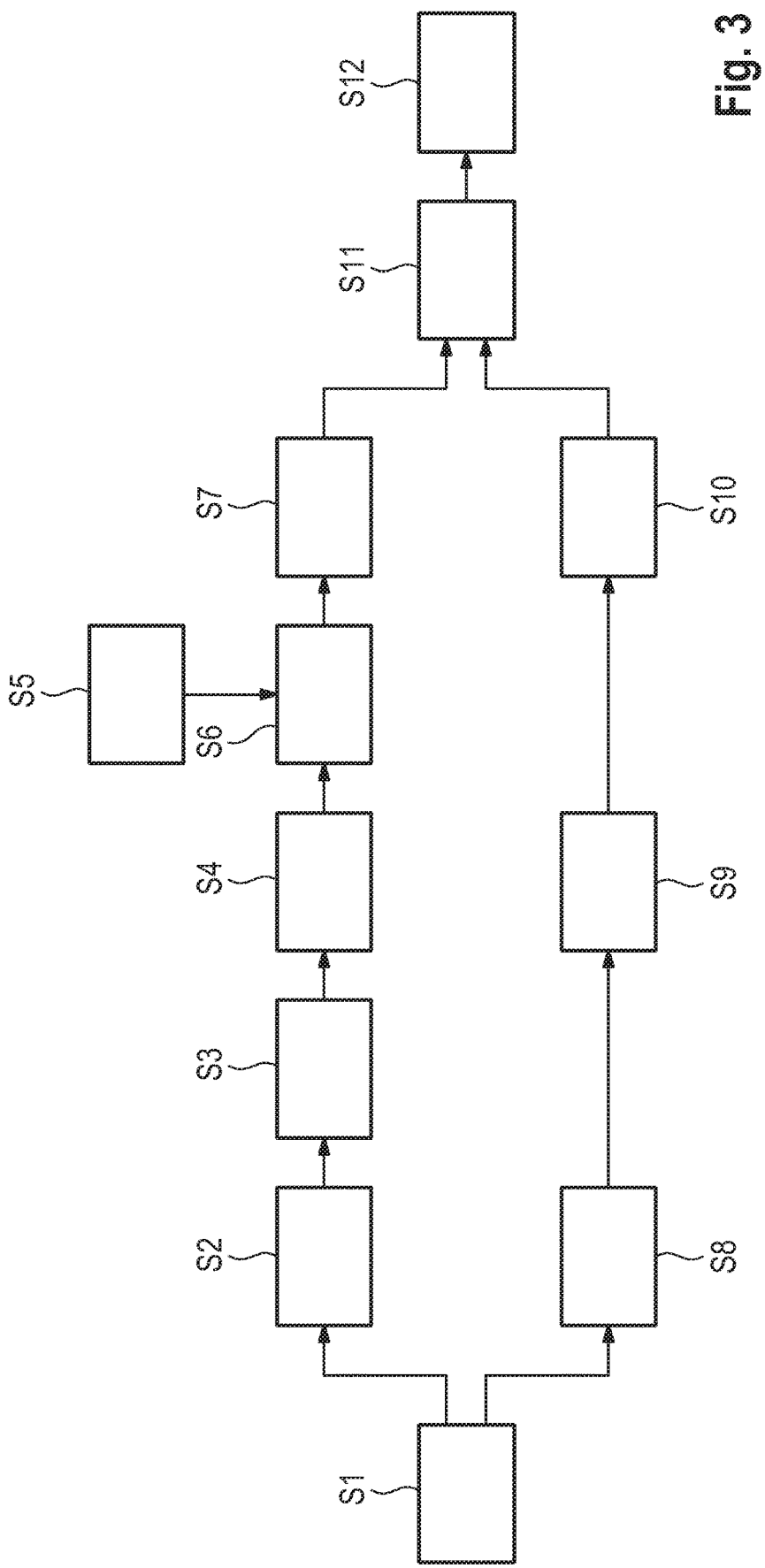
FIG. 3 shows a flow-chart of a method for controlling access to a vehicle according to the disclosure.

The method for gaining access to the vehicle 12 is shown as a flow-chart in FIG. 3.

When the user uses a door handle of one of the doors 20, an entry request is generated and received by the vehicle control module 32 (step S1).

Alternatively or in addition, the entry request may also be generated by the proximity sensor 46 when the proximity sensor detects that the user is in the proximity of one of the doors 20 of the vehicle 12.

Upon the reception of the entry request, the vehicle control module 32 performs two actions.

On the one hand, in step S2, a communication with the mobile device 16 is initiated and instructions are sent by the vehicle control module 32 to the mobile device 16 via the transceiver 30 and the wireless communication module 42, for example using the Bluetooth protocol.

With the instructions, the mobile device 16 is instructed to determine its GPS location, i.e. the GPS location M of the mobile device, using the GPS module 44 of the mobile device 16 (step S3).

In step S4, the mobile device transmits the GPS location M of the mobile device to the vehicle control module 32 via the wireless communication module 42 and the transceiver 30 (step S4).

In step S5, the GPS location V of the vehicle 12 is determined, for example using the GPS receiver 28.

Step S5 may have been carried out already beforehand, for example, as soon as it has been determined by the vehicle based system 14 that the vehicle 12 is parked.

In step S6, the vehicle control module 32 compares the GPS location V of the vehicle 12 with the GPS location M of the mobile device 16 and determines whether or not the mobile device 16 is outside a predetermined distance from the vehicle 12.

The predetermined distance may be the same distance as the operating range of the transceiver 30 and/or of the base station 34.

If the mobile device 16 is outside the predetermined distance, then the vehicle control module 32 blocks the access or entry of the user to the vehicle 12 because it is assumed that the real user of the vehicle 12 is not the person trying to gain access to the vehicle 12.

If the mobile device 16 is within the predetermined distance from the GPS location V of the vehicle 12, then access or entry may be granted.

During steps S1 to S6, the vehicle control module 32 may also verify, if the mobile device 16 that has been requested to send its GPS location or will be requested to send its GPS location is authenticated with the vehicle control module 32 (step S7).

If this specific mobile device 16 is not authenticated, i.e. the mobile device 16 is not listed as a trusted device with the vehicle control module 32, entry to the vehicle 12 is blocked.

If the mobile device 16 is authenticated, then entry to the vehicle 12 may be granted.

After it has been determined that access may be granted, or right after reception of the entry request, the vehicle control module 32 controls the base station 34 to create an electromagnetic field with the first frequency $f_1$, which includes specific information (step S8).

The electromagnetic field is received by the security token 18, more precisely the receiver 38 of the security token 18 and in response to the reception of the electromagnetic field, the security token 18 transmits a message to the vehicle-based system 14 (step S9).

The message may include the information of the electromagnetic field or a suitable response to the information.

The message is sent via the transmitter 40 of the security token 18 as a signal with the second frequency $f_2$, for example as a radio frequency transmission.

The message is received by the receiver 36 of the vehicle based system 14 and routed to the vehicle control module 32.

In the next step S10, the message is verified by the vehicle control module 32 and access to the vehicle may be granted if the verification has been successful. Otherwise, access, i.e. entry to the vehicle 12 is blocked by the vehicle control module 32.

The method for generating the electromagnetic field with the first frequency $f_1$, and generating a message in response by the security token 18 and verifying this message is per se known in the prior art regarding keyless entry systems or passive entry systems and may include cryptographic steps, that are omitted in this description for reasons of clarity.

In the next step S11, the vehicle control module 32 determines that access to the vehicle 12 is to be granted if in the previous steps it has been determined that the GPS location M of an authenticated mobile device 16 is within the predetermined distance from the stored GPS location V of the vehicle 12 and if the message from the security token 18 has been verified successfully.

Then, in step S12, the vehicle control module 32 controls the door locks 22 to unlock the doors 20 of the vehicle 12. The user can then access and enter the vehicle 12.

Thus, relay attacks as explained above are prevented by requiring that the mobile device is close to the vehicle.

The invention claimed is:

1. A method for controlling access to a vehicle, comprising:
   providing a vehicle-based system comprising a transceiver operatively connected with a vehicle control module; and
   providing a mobile device having a GPS module and a wireless communication module;
   storing at the vehicle-based system a GPS location of the vehicle associated with the location at which the vehicle is parked;
   communicating via the vehicle-based system with the mobile device via the transceiver and the wireless communication module to obtain a GPS location of the mobile device; and
   blocking via the vehicle-based system entry to the vehicle if the GPS location of the mobile device is outside a predetermined distance from the stored GPS location of the vehicle.

2. The method recited in claim 1, comprising the following further steps:

sending instructions to the mobile device via the transceiver and the wireless communication module requesting the GPS location of the mobile device, determining the GPS location of the mobile device using the GPS module, and transmitting the GPS location of the mobile device to the vehicle control module via the wireless communication module and the transceiver.

3. The method recited in claim 1, comprising the step of determining via the vehicle-based system when the vehicle is parked.

4. The method recited in claim 1, comprising the following further steps:

verifying whether the mobile device is authenticated with the vehicle control module, and blocking entry to the vehicle if the mobile device is not authenticated with the vehicle control module.

5. The method recited in claim 1, comprising the following further steps:

receiving an entry request by the vehicle control module;

allowing entry to the vehicle if at least the GPS location of the mobile device is within a predetermined distance from the stored GPS location of the vehicle.

6. The method recited in claim 5, wherein the communication to obtain the GPS location of the mobile device is initiated upon the entry request.

7. The method recited in claim 5, comprising the following further steps:

the vehicle based system having a base station in the vehicle configured to generate an electromagnetic field having a first frequency and having a receiver to receive transmissions having a second frequency, providing a security token having a receiver for the electromagnetic field having the first frequency and a transmitter for transmissions having the second frequency;

generating the electromagnetic field having the first frequency by the base station and receiving the electromagnetic field by the security token;

transmitting a message by the security token to the vehicle based system via the transmitter of the security token and the receiver of the vehicle based system;

verifying the message via the vehicle control module; and allowing entry to the vehicle if at least the verification was successful and the GPS location of the mobile device is within a predetermined distance from the stored GPS location of the vehicle.

8. The method recited in claim 7, wherein the security token is a key fob.

9. The method recited in claim 7, wherein the first frequency is lower than the second frequency.

10. The method recited in claim 9, wherein the first frequency is a low-frequency and the second frequency is a radio-frequency.

11. The method recited in claim 7, wherein the receiver of the security token is a RFID-receiver or a RFID-transponder.

12. The method recited in claim 7, wherein the entry request is generated when using a door handle of the vehicle or when a proximity sensor detects the proximity of a person at a door of the vehicle.

13. The method recited in claim 5, wherein the determination if the GPS location of the mobile device is outside the predetermined distance from the stored GPS location of the vehicle is made after receiving the entry request by the vehicle control module.

14. A system for controlling access to a vehicle, comprising:

a vehicle-based system comprising a transceiver operatively connected with a vehicle control module and a mobile device, wherein the mobile device and the vehicle-based system are configured to jointly perform a method for controlling access to a vehicle, the method comprising:

providing a vehicle-based system comprising a transceiver operatively connected with a vehicle control module; and providing a mobile device having a GPS module and a wireless communication module;

storing at the vehicle-based system a GPS location of the vehicle associated with the location at which the vehicle is parked;

communicating via the vehicle-based system with the mobile device via the transceiver and the wireless communication module to obtain a GPS location of the mobile device; and blocking via the vehicle-based system entry to the vehicle if the GPS location of the mobile device is outside a predetermined distance from the stored GPS location of the vehicle.

15. The system recited in claim 14, wherein the system is a vehicle keyless entry system.

16. The system recited in claim 14, wherein the system comprises a security token.

17. The system recited in claim 14, wherein the mobile device and the vehicle-based system are configured to make the determination if the GPS location of the mobile device is outside the predetermined distance from the stored GPS location of the vehicle is made after receiving the entry request by the vehicle control module.

* * * * *